United States Patent [19]

Teramachi

[11] Patent Number: 4,515,413
[45] Date of Patent: May 7, 1985

[54] LINEAR SLIDE BEARING

[76] Inventor: Hiroshi Teramachi, 2-34-8, Higashi-Tamagawa, Setagaya-Ku, Tokyo, Japan

[21] Appl. No.: 613,617

[22] Filed: May 24, 1984

[51] Int. Cl.$^3$ .............................................. F16C 29/06
[52] U.S. Cl. .................................................... 308/6 C
[58] Field of Search .............. 308/3 R, 3 A, 6 R, 6 A, 308/6 B, 6 C

[56] References Cited

U.S. PATENT DOCUMENTS

| | | | |
|---|---|---|---|
| 3,436,132 | 4/1969 | Wiesler | 308/6 C |
| 3,876,264 | 4/1975 | McCloskey | 308/6 C |
| 4,025,995 | 5/1977 | Thomson | 308/6 C X |
| 4,253,709 | 3/1981 | Teramachi | 308/6 C |
| 4,296,974 | 10/1981 | Teramachi | 308/6 C |
| 4,390,215 | 6/1983 | Mottate | 308/6 C |

Primary Examiner—John Petrakes
Assistant Examiner—David Werner
Attorney, Agent, or Firm—Kenyon & Kenyon

[57] ABSTRACT

A linear slide bearing for use in, for example, a machining center has a main body being an integral member constituted by right and left skirt portions defining a central cavity therebetween, each skirt portion being provided in its inner surface with a race-receiving groove opened to the central cavity, the race-receiving groove having a stopper projecting at its lower arcuate end, and each skirt portion further having a non-loaded ball passage bored therethrough. The linear slide bearing further has a pair of right and left bearing races each constituted by an arcuate member of semicircular cross-section having a barrel-like outer peripheral surface and rockably mounted within the corresponding race-receiving groove formed in the main body, the arcuate member being provided in its inner surface center with a loaded ball groove having a curvature center which is coincident with that of the race-receiving groove. A race-pressing member is constituted by a wedge member adjustably screwed to the inner surface of a ceiling portion of the main body, the race-pressing member being adapted to press the bearing races toward the stoppers with its wedge surfaces which are simultaneously made to abut on one of the inner side surfaces of the bearing races.

4 Claims, 21 Drawing Figures

LINEAR SLIDE BEARING

BACKGROUND OF THE INVENTION

Figure 21:
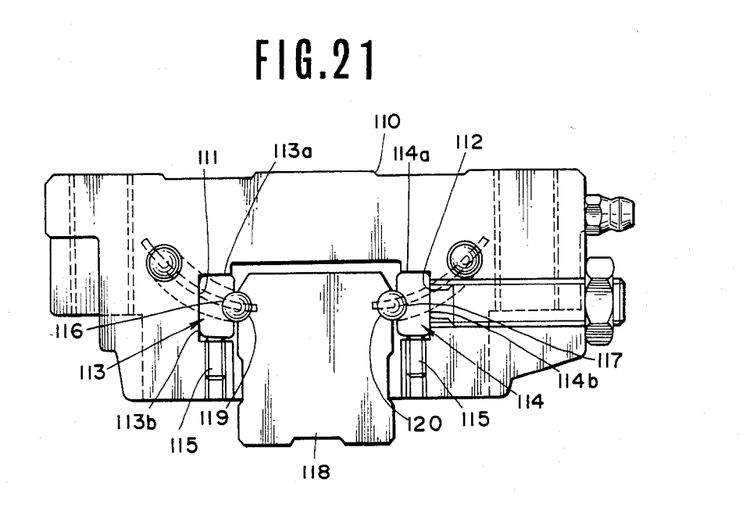
FIG. 21 is a front elevational view of a conventional linear slide bearing.

The present invention relates to a linear slide bearing suitable for use in various sliding parts such as the table saddle of a machine tool, the slider of a machining center, and the slider of a transportation robot for reciprocative transportation of a heavy object. More particularly, the present invention pertains to a linear slide bearing having an automatic aligning function In a typical conventional linear slide bearing, as shown in FIG. 21, for example, a main body 110 of the bearing has longitudinal recesses 111, 112 respectively fitted with bearing races 113, 114 of rectangular cross-section similarly extending in the longitudinal direction of the main body 110. The bearing races 113, 114 are screwed to the recesses 111, 112 to form respective loaded ball passages between loaded ball grooves 116, 117 on the bearing races 113, 114 and loaded ball grooves 119, 120 on a track shaft 118. Further, the loaded ball grooves 116, 117, 119, 120 and their corresponding non-loaded ball grooves are communicated with each other to form respective endless tracks through which balls are recirculated, thereby allowing the main body 110 to effect a linear slide motion.

When a transportation robot, for example, is to be constructed by employing a linear slide bearing having the above-described construction, a plurality of track shafts 118 are generally laid such as to extend coaxially in the longitudinal direction under the necessity of enlarging the transportation operation range. In the case where the track shafts 118 are laid over a long distance, however, mounting errors or other failures may prevent the longitudinal axes of the track shafts 118 connected to each other from aligning with each other on a straight line, so that the lined track shafts 118 may horizontally or vertically bend disadvantageously. In such case, since the upper surfaces 113a, 114a and rear surfaces 113b, 114b of the bearing races 113, 114 are respectively closely secured to the wall surfaces of the recesses 111, 112 of the main body 110 according to the conventional construction, the contact pressure of the balls locally increases when the main body 110 passes the bent portion of the lined track shafts 118, thus causing dents in the surfaces of the loaded ball grooves 116, 117, 119, 120. Also, when passing the bent portion of the lined track shafts 118, the main body 110 encounters an increased resistance to its sliding motion, so that it is not possible to ensure a smooth linear slide motion of the main body 110.

SUMMARY OF THE INVENTION

Under these circumstances, the invention aims as its primary object at overcoming the above-described problems of the prior art.

Accordingly, it is an object of the invention to provide a linear slide bearing having an automatic aligning function provided by bearing races in which bearing races having a barrel-like appearance are swingably retained within the corresponding race-receiving grooves on the main body of the bearing so that the bearing races can change their directions to properly follow any vertical or horizontal bend of the track shaft.

To this end, according to the invention, there is provided a linear slide bearing comprising: a main body being an integral member constituted by right and left skirt portions defining a central cavity therebetween, each skirt portion being provided in its inner surface with a race-receiving groove opened to the central cavity, the race-receiving groove having a stopper projecting at its lower arcuate end, and each skirt portion further having a non-loaded ball passage bored therethrough; a pair of right and left bearing races each constituted by an arcuate member of semicircular cross-section having a barrel-like outer peripheral surface and rockably mounted within the corresponding race-receiving groove formed in the main body, the arcuate member being provided in its inner surface center with a loaded ball groove having a curvature center which is coincident with that of the race-receiving groove; a race-pressing member constituted by a wedge member adjustably screwed to the inner surface of a ceiling portion of the main body, the race-pressing member being adapted to press the bearing races toward the stoppers with its wedge surfaces which are simultaneously made to abut on one of the inner side surfaces of the bearing races; a track shaft adapted to be fitted in the central cavity of the main body and provided on its right and left side surfaces with loaded ball grooves each having a curvature center which is coincident with that of the corresponding loaded ball groove on each bearing race; a pair of front and rear end covers constituted by cover members adapted to be secured to the longitudinal end surfaces of the main body, each cover member being provided in its inner surfaces with ball turning grooves providing communication between loaded ball passages, which are defined by the loaded ball grooves on the bearing races and track shaft, and the non-loaded ball passages formed through the main body, as well as race retaining grooves for supporting one of the ends of the bearing races; and balls adapted to be recirculated through the loaded ball passages and non-loaded ball passages respectively communicated with each other.

The above and other objects, features and advantages of the invention will become clear from the following description of the preferred embodiment thereof taken in conjunction with the accompanying drawings.

BRIEF DESCRIPTION OF THE DRAWINGS

FIGS. 1 to 20 in combination show an embodiment of the linear slide bearing in accordance with the present invention, in which:

DESCRIPTION OF THE PREFERRED EMBODIMENT

A preferred embodiment of the invention will be described hereinunder with reference to the accompanying drawings.

A linear slide bearing in accordance with the invention has a main body generally denoted by the reference numeral 1. The main body 1 is an integral member of channel-like cross-section constituted by a ceiling portion 2 and left and right skirt portions 4, 5 defining therebetween a central cavity 3 having a substantially rectangular cross-section.

Figure 1:
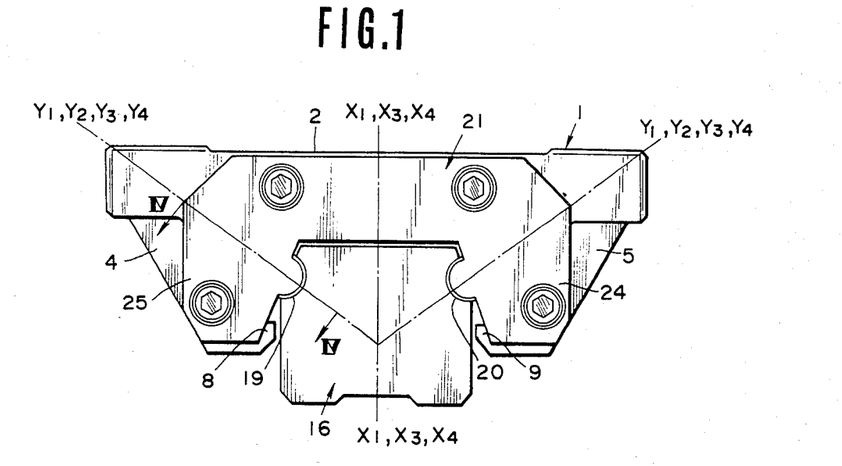
FIG. 1 is a front elevational view of the linear slide bearing.
Figure 2:
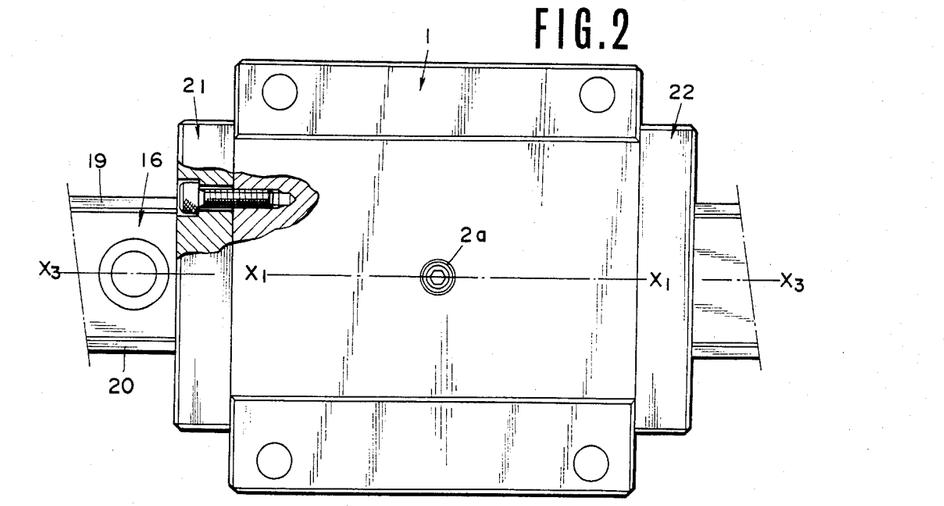
FIG. 2 is a plan view of the linear slide bearing.
Figure 3:
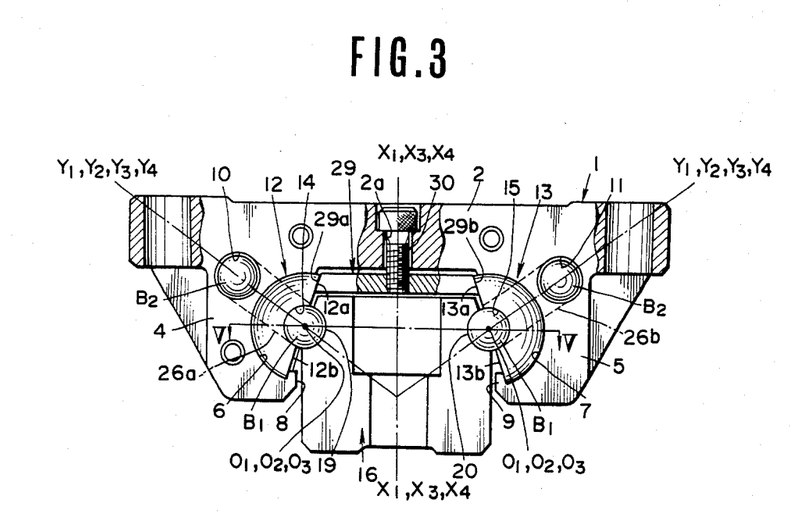
FIG. 3 is a front elevational view of the linear slide bearing with one of the end covers thereof removed.
Figure 6:
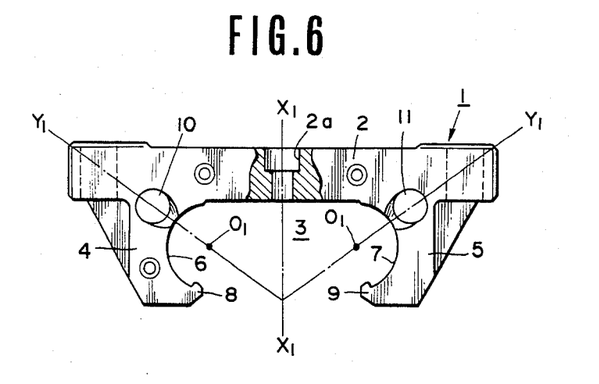
FIG. 6 is a front elevational view of a main body of the bearing.
Figure 7:
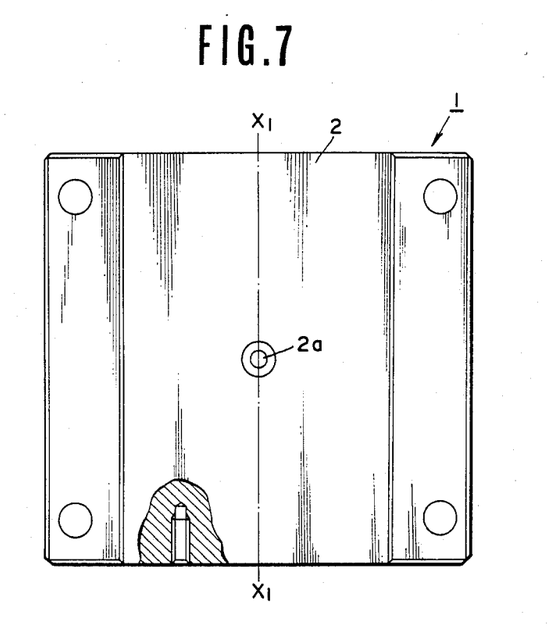
FIG. 7 is a plan view of the main body.
Figure 8:
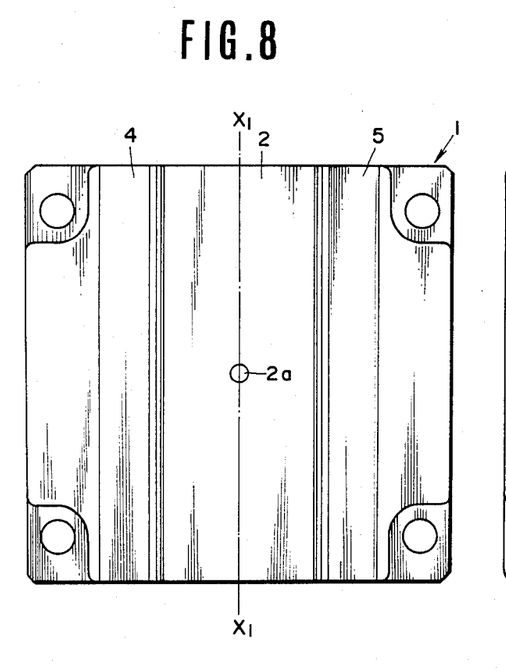
FIG. 8 is a bottom view of the main body.
Figure 9:
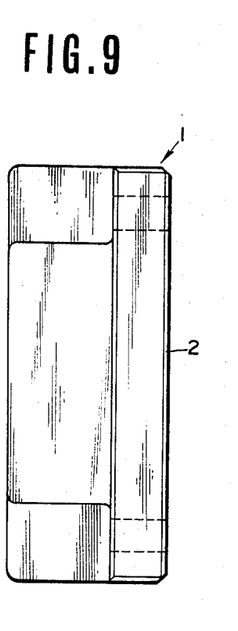
FIG. 9 is a side elevational view of the main body.

The reference numerals 6, 7 denote left and right race-receiving grooves of semicircular cross-section which are formed in the opposing inner surfaces of the skirt portions 4, 5 in symmetry with each other with respect to the longitudinal axis of the main body 1 such as to open to the central cavity 3. There are provided stoppers 8, 9 projecting such as to cross the openings of the race-receiving grooves 6, 7, at the respective bottom ends of the arcuate grooves constituting the race-receiving grooves 6, 7, that is, the lower ends of the arcuate grooves remoter from the ceiling portion 2. It is to be noted that the symbol $O_1$ denotes the curvature center of each of the race-receiving grooves 6, 7 which is set on an imaginary line $Y_1$—$Y_1$ intersecting the longitudinal axis $X_1$—$X_1$ of the main body 1 at an angle of about 55°. The reference numerals 10, 11 respectively represent non-loaded ball passages of circular cross-section bored through the solid portions of the skirt portions 4, 5. Each non-loaded ball passage is substantially equal in curvature to balls and has a diameter larger than the ball diameter. The non-loaded ball passages 10, 11 are axially provided over the entire length of the main body 1. Thus, as shown in FIGS. 3 and 6, the non-loaded ball passages 10, 11 are located on the corresponding imaginary lines $Y_1$—$Y_1$ intersecting the longitudinal axis $X_1$—$X_1$ of the main body 1 at an angle of about 55°. It is to be noted that the reference numeral 2a in the Figures represents tapped holes bored through the ceiling portion 2 of the main body 1 at predetermined spacings along the center of the ceiling portion 2 in the longitudinal direction.

The main body 1, having the above-described construction, is formed from a light-weight material such as a synthetic resin. The light-weight main body 1 effectively decreases the inertia and therefore can be suitably used for the linear slide bearing which is required to move at high speed through repetitional start and stop.

A pair of left and right bearing races 12, 13, each being an arcuate member having a semicircular cross-section, are adapted to be received in the race-receiving grooves 6 and 7 formed in the main body 1. As specifically shown in FIGS. 3, 10 and 11, loaded ball grooves 14, 15, each having a semicircular cross-section, are formed in the inner peripheral surfaces of the bearing races 12, 13 such as to extend in the axial direction of the main body 1 correspondingly to the non-loaded ball passages 10, 11 bored through the main body 1. The curvature center $O_2$ of each loaded ball groove is coincident with the curvature center $O_1$ of the corresponding race-receiving groove. Thus, the loaded ball grooves 14, 15 have their respective curvature centers $O_2$ set on the corresponding imaginary lines $Y_2$—$Y_2$ each intersecting, at an angle of about 55°, the symmetry axis $X_2$—$X_2$ which is coincident with the longitudinal axis $X_1$—$X_1$ of the main body 1. In addition, balls $B_1$ under the load contact the surfaces of the corresponding loaded ball grooves 14, 15 at a contact angle $\beta$ which is selected to be 45°. Consequently, the area of contact between the surface of each loaded ball $B_1$ and the surface of the associated loaded ball groove 14 or 15, afforded by elastic deformation of the ball and the groove, is increased to reduce the level of the load born by the unit area of the contact region thereby to increase the load bearing capacity of the linear slide bearing as a whole.

Figure 10:
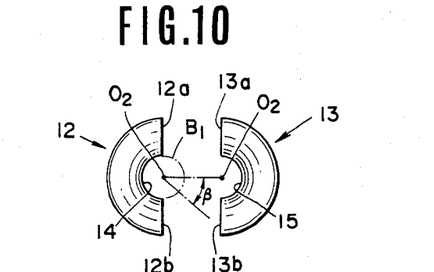
FIG. 10 is a front elevational view of bearing races.
Figure 11:
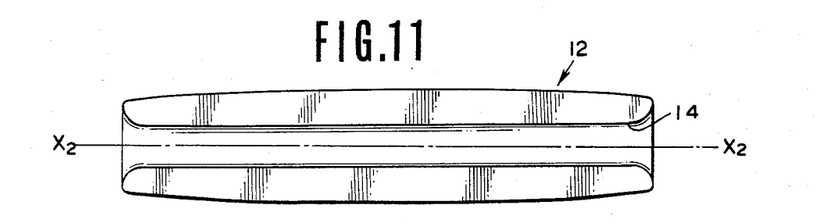
FIG. 11 is a side elevational view of one of the bearing races shown in FIG. 10.

Further, each of the loaded ball grooves 14, 15 is constituted by a groove having an arcuate cross-section of a radius of curvature which is about a half of that of the ball. The formation of the loaded ball grooves 14, 15 by such arcuate grooves permits each loaded ball $B_1$ to make contact at two points in the direction of contact even when a preload (pre-compression) is applied to the bearing or a load is applied thereto in any direction; therefore, the loaded balls $B_1$ perform an excellent sliding motion without causing any differential slip. Moreover, since the arcuate grooves permit the loaded balls $B_1$ to make two-point contact, even when a heavy load is applied, the balls are elastically deformed to make it possible to obtain a wide width of contact, resulting in an increase in rigidity. Furthermore, both the ideal arrangement, in which the two arcuate grooves are provided with a proper angle of contact, and the structure, which permits each ball to make two-point contact, provide a space for elastic deformation of the ball. Therefore, even if the mounting surface has any error, it is absorbed inside the bearing, so that it is possible to obtain a natural, smooth motion of the bearing.

Figure 4:
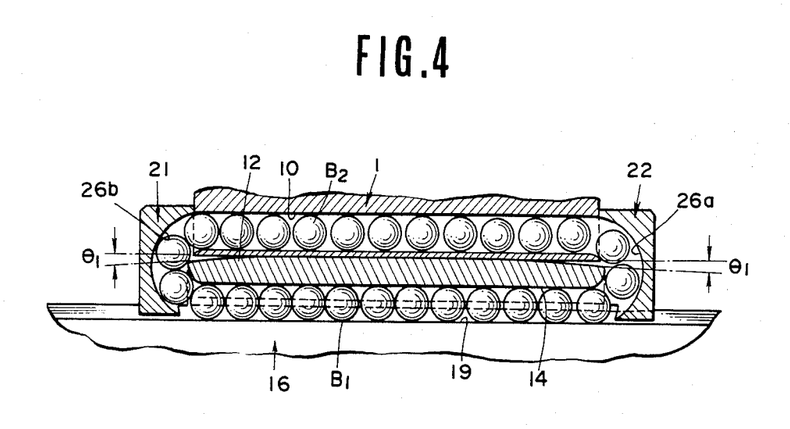
FIG. 4 is an obliquely cut sectional side elevational view taken along the line IV—IV of FIG. 1.
Figure 5:
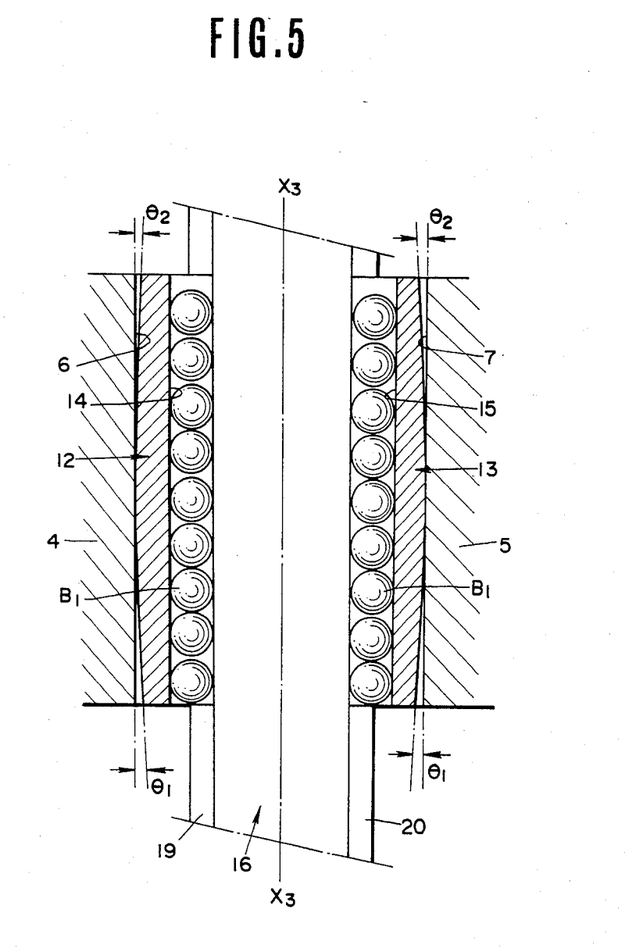
FIG. 5 is a sectional view taken along the line V—V of FIG. 3.

Moreover, each of the bearing races 12, 13 has an outer peripheral surface with a barrel-like appearance as shown in FIGS. 4, 5 and 10. Consequently, longitudinal clearances $\theta_1$, $\theta_1$ and lateral clearances $\theta_2$, $\theta_2$ are formed between the race-receiving grooves 6, 7 each constituted by a flat surface and the end portions of the barrel-shaped bearing races 12, 13, so that the bearing races 12, 13 are able to swing vertically and horizontally with their central portions as the fulcrums with respect to the race-receiving grooves 6, 7 of the main body 1. Accordingly, even in the case where a track shaft 16, described later, is bent, when the main body 1 passes the bent portion of the track shaft 16, the bearing races 12, 13 swing to change their directions in proportion to the degree of bend so as to properly follow the bend of the track shaft 16. When the main body 1 reaches a normal, straight portion of the track shaft 16, the bearing races 12, 13 swing again to return to their normal state, thereby allowing their symmetry axis $X_2$—$X_2$ to coincide with the longitudinal axis $X_3$—$X_3$ of the track shaft 16. Thus, the linear slide bearing in accordance with the invention effects its aligning operation.

Figure 12:
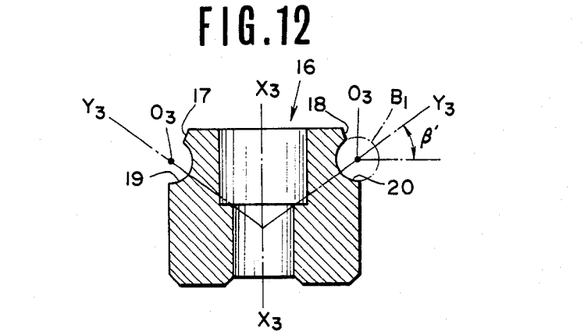
FIG. 12 is a vertical sectional view of a track shaft, taken through an intermediate portion thereof in the longitudinal direction.
Figure 13:
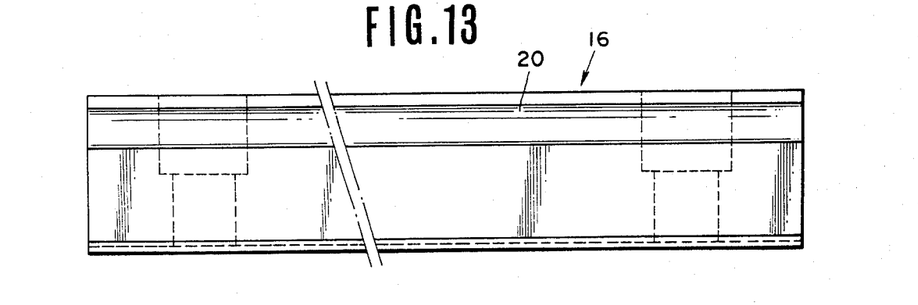
FIG. 13 is a side elevational of the track shaft.
Figure 14:
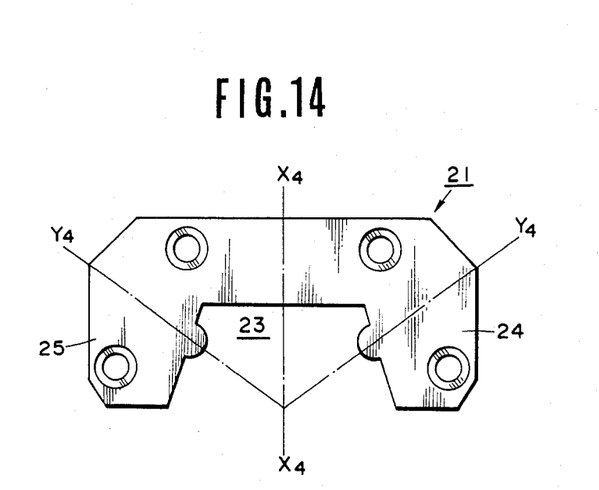
FIG. 14 is a front elevational view of the end cover, showing the outer surface thereof.

The track shaft 16 is adapted to be fitted in the central cavity 3 of the main body 1 and mounted to a movable or fixed part of a machine tool or the like by the use of bolts or other fixing means. As shown in FIGS. 3, 12 and 13, the track shaft 16 has on its left and right inclined surfaces 17, 18 loaded ball grooves 19, 20 of semicircular cross-section axially extending correspondingly to the loaded ball grooves 14, 15 on the bearing races 12, 13. The curvature center $O_3$ of each of the loaded ball grooves 19, 20 is set on an imaginary line $Y_3$—$Y_3$ intersecting, at an angle of about 55°, the longitudinal axis $X_3$—$X_3$ of the track shaft 16 which coincides with the longitudinal axis $X_1$—$X_1$. In addition, the curvature center $O_3$ is coincident with both the curvature center $O_1$ of each of the race-receiving grooves 6, 7 and the curvature center $O_2$ of the loaded ball grooves 14, 15 formed in the bearing races 12, 13. Thus, two loaded passages are defined by these loaded ball grooves 14, 15 and 19, 20. Further, similarly to the loaded ball grooves 14, 15 on the bearing races 12, 13, each of the loaded ball grooves 19, 20 on the track shaft 16 is constituted by a groove having an arcuate cross-section of a radius of a curvature which is about a half of that of the ball. Moreover, similarly to the loaded ball grooves 14, 15 on the bearing races 12, 13, the loaded ball grooves 19, 20 on the track shaft 16 have a contact angle $\beta_1'$ of 45° with respect to the loaded balls $B_1$ to increase the load bearing capacity of the bearing.

Balls B, adapted to be interposed between the bearing races 12, 13 and the track shaft 16 so as to recirculate, include loaded balls $B_1$, which are bearing a load while rolling along the passages respectively defined between the loaded ball grooves 14, 15 on the bearing races 12, 13 and the loaded ball grooves 19, 20 on the track shaft 16, and non-loaded balls $B_2$, which are rolling through the non-loaded ball passages 10, 11 formed through the main body 1. It is to be noted that the same ball B is referred to as the loaded ball $B_1$ when it is in the loaded region and as the non-loaded ball $B_2$ when it rolls along the non-loaded region.

Figure 15:
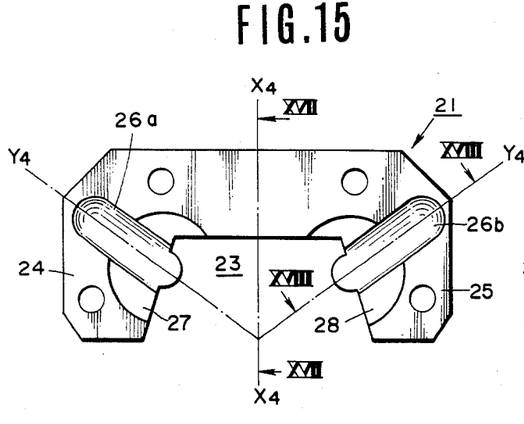
FIG. 15 is a rear view of the end cover, showing the inner surface thereof.
Figure 16:
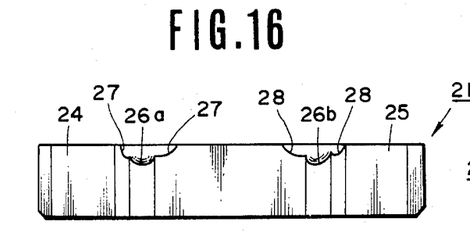
FIG. 16 is a bottom view of the end cover.
Figure 17:
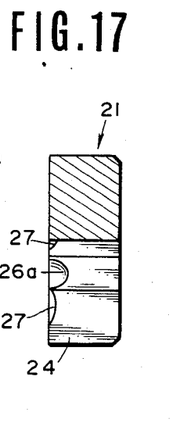
FIG. 17 is a sectional view taken along the line XVII—XVII of FIG. 15.
Figure 18:
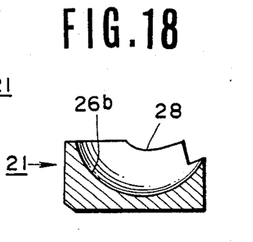
FIG. 18 is an obliquely cut sectional end view taken along the line XVIII—XVIII of FIG. 15.
Figure 19:
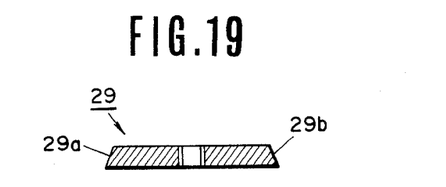
FIG. 19 is a vertical sectional view of a race-pressing member, taken through an intermediate portion thereof in the longitudinal direction.
Figure 20:
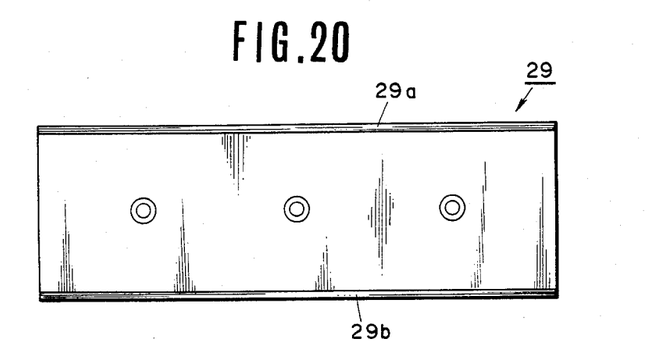
FIG. 20 is a plan view of the race-pressing member.

The reference numerals 21, 22 denote end covers adapted to be attached to the longitudinal end surfaces of the main body 1 by the use of bolts or other fixing means. The end covers 21, 22 are made of a synthetic resin material by injection molding or a die casting alloy by die casting. The construction of the end covers 21, 22 will be described hereinunder through one end cover 21 with reference to FIGS. 14 to 18. The end cover 21 is constituted by a cover member of channel-like cross-section which has in its center a substantially rectangular central cavity 23 and is provided with left and right skirt portions 24, 25 interposing the central cavity 23 therebetween. Thus, the end cover 21 has an inner peripheral configuration similar to that of the main body 1. The end cover 21 further has ball turning grooves 26a, 26b formed such as to curve toward the corresponding outer surfaces of the cover member. The disposition of the ball turning grooves 26a, 26b will be explained hereinunder in more detail. As shown in FIG. 15, each of the ball turning grooves 26a, 26b is disposed on an imaginary line $Y_4$—$Y_4$ intersecting, at an angle of about 55°, the longitudinal axis $X_4$—$X_4$ of the end cover 21 which coincides with the longitudinal axis $X_1$—$X_1$, and extends by a predetermined length along the intersection line $Y_4$—$Y_4$. Thus, the starting ends of the ball turning grooves 26a, 26b correspond to one of the ends of the loaded ball passages respectively defined by the loaded ball grooves 14, 15 on the bearing races 12, 13 and the loaded ball grooves 19, 20 on the track shaft 16, while the terminating ends of the ball turning grooves 26a, 26b correspond to one of the ends of the non-loaded ball passages 10, 11 formed through the main body 1.

To sum up, the ball turning grooves 26a, 26b have the starting ends thereof communicated with the loaded passages defined by the loaded ball grooves 14, 15 and 19, 20, and the terminating ends thereof communicated with the non-loaded ball passages 10, 11. Accordingly, the end cover 21 with the ball turning grooves 26a, 26b provides a communication between the front sides of the loaded ball passages respectively defined by the loaded ball grooves 14, 15 and 19, 20, and the front sides of the non-loaded ball passages 10, 11. On the other hand, the other sides of the loaded ball passages defined by the loaded ball grooves 14, 15 and 19, 20 and the other sides of the non-loaded ball passages 10, 11 are communicated with each other through the other end cover 22 having the same construction as that of the end cover 21. Thus, a ball recirculating passage is completed by cooperation of a loaded ball passage defined by the loaded ball grooves 14, 19 and the non-loaded ball passage 10, for example (see FIG. 3).

The end cover 21 is further provided in its inner surface with race-retaining grooves 27, 28 of semicircular shape in plan. Each of the race-retaining grooves 27, 28 has its center disposed on the imaginary line $Y_4$—$Y_4$ intersecting the longitudinal axis $X_4$—$X_4$ of the side cover 22 at an angle of about 55°. The race-retaining grooves 27, 28 have a radius larger than that of the bearing race end portion in order to allow the bearing races 12, 13 to swing vertically and horizontally.

The reference numeral 29 denotes a race-pressing member adjustably screwed to the ceiling portion 2 of the main body 1 through fixing means such as bolts 30 or the like. The race-pressing member 29 is constituted by a wedge member formed from a plate of trapezoidal cross-section. The race-pressing member 29 is supported by the bolts 30 screwed into the respective tapped holes 2a formed in the ceiling portion 2. Wedge surfaces 29a, 29b of the race-pressing member 29 are made to abut on longitudinal upper inner side surfaces 12a, 13a of the bearing races 12, 13 mounted within the race-receiving grooves 6, 7 formed in the main body 1. Then, the race-pressing member 29 under this state is upwardly pulled by means of a screwing operation. Consequently, through its wedge action, the race-pressing member 29 forcedly enters both gaps defined between the ceiling portion 2 and the longitudial upper inner side surfaces 12a, 13a of the bearing races 12, 13 opposing each other, to fit with the bearing races 12, 13. As a result, the bearing races 12, 13 are pressed in their respective rotational directions by the race-pressing member 29 through the longitudinal upper inner side surfaces 12a, 13a. Accordingly, in FIG. 3, one bearing race 12 is pressed so as to rotate counterclockwise, while the other bearing race 13 is pressed so as to rotate clockwise, and longitudinal lower inner side surfaces 12b, 13b, opposite to the inner side surfaces 12a, 13a, abut on the stoppers 8, 10, respectively. In this case, since the curvature center $O_1$ of each of the race-receiving grooves 6, 7 is completely coincident with the curvature center $O_2$ of each of the loaded ball grooves 14, 15 formed in the bearing races 12, 13, respectively, there is no possibility of any undesirable displacement of the curvature center $O_2$ of each of the loaded ball grooves 14, 15 formed in the bearing races 12, 13, even if there is any error in operation for mounting the bearing races 12, 13 by means of the race-pressing member 29. Thus, according to the present invention, the left and right bearing races 12, 13 can be simultaneously fixed with high accuracy simply by manipulating a single race-pressing member 29.

The following is the description of the operation of the linear slide bearing in accordance with the invention, having the above-described construction.

A linear slide bearing unit in accordance with the invention is mounted on the track shaft 16 of a machining center (not shown), for example, and a necessary instrument or tool is set on the main body 1. Then, the bearing unit is moved back and forth, so that the loaded balls $B_1$, which are held within the loaded ball passages defined by the loaded ball grooves 14, 15 on the bearing races 12, 13 and the loaded ball grooves 19, 20 on the track shaft 16 are made to run in one direction while being guided by the loaded ball passages. In due course, the loaded balls $B_1$ are turned to change the running direction from the linear direction to the circular direction by the ball turning grooves 26a, 26b formed in the end cover 22, and are sent into the non-loaded ball passages 10, 11 formed through the main body 1 to run as the non-loaded balls $B_2$. Thereafter, the non-loaded balls $B_2$ running out of the non-loaded ball passages 10, 11 are then turned to change the direction from the linear direction to the circular direction by the ball turning grooves 26a, 26b formed in the other end cover 21, and are returned to the loaded ball passages defined by the loaded ball grooves 14, 15 on the bearing races 12, 13 and the loaded ball grooves 19, 20 on the track shaft 16 to roll along these passages as the loaded balls $B_1$ again. Thereafter, the balls B repeat recirculation through the same movements.

Even in the case where the track shaft 16 is bent horizontally or vertically, the pair of left and right bearing races 12, 13 integrated with each other by means of the race-pressing member 29 swing to change their directions so as to properly follow the bend of the track shaft 16 by the clearances $\theta_1$, $\theta_1$ and $\theta_2$, $\theta_2$ formed between the bearing races 12, 13 and the race-receiving grooves 6, 7. After the main body 1 has passed a vertically or horizontally bent portion of the track shaft 16, the bearing races 12, 13 swing again to change their directions along a normal, straight portion of the track shaft 16 and return to their normal state, thereby allowing the symmetry axis $X_2$—$X_2$ of the bearing races 12, 13 to coincide with the longitudinal axis $X_3$—$X_3$ of the track shaft 16 and thus completing the aligning operation. It is to be noted that in the case where the track shaft 16 is bent vertically, the change in direction of the bearing races 12, 13 is attained by the vertical swing of the pair of left and right bearing races 12, 13 with their central portions as the fulcrums with respect to the race-pressing member 29 secured to the main body 1. On the other hand, in the case where the track shaft 16 is horizontally bent, the bearing races 12, 13 change their directions through the integral horizontal swing of the race-pressing member 29 and the bearing races 12, 13 integrated thereby on the connection of the race-pressing member 29 with the main body 1, that is, the position of the tapped hole 2a as the fulcrum.

The linear slide bearing of the invention, having the above-described construction and operation, offers the following various advantages:

First of all, since the bearing races having a barrel-like appearance are swingably retained within the corresponding race-receiving grooves on the main body of the bearing, the bearing races are allowed to change their directions so as to properly follow the vertically or horizontally bent portion of the track shaft. It is, therefore, possible not only to prevent the local increase in contact pressure of the balls which otherwise occurs when the main body passes the bent portion of the track shaft but also to reduce the resistance encountered by the main body when it slides. Thus, it is advantageously possible to ensure the safety of the loaded ball passages and a smooth sliding motion of the main body of the bearing. Further, since each bearing race is constituted by an arcuate member of semicircular cross-section having a large torsional resistance, the bearing race is not twisted when a load is applied thereto. As a result, the contact pressure of the balls rolling along the bearing race can be maintained to be uniform; hence, it is possible to ensure a smooth recirculation of the balls.

Moreover, since the pair of right and left bearing races retained by the fixing surfaces of the end covers can be simultaneously fixed simply by adjusting a single race-pressing member, the operation for mounting the bearing races is extremely simplified, thereby allowing a reduction in the production cost of the bearing unit as a whole. Furthermore, even when there is any error produced in the degree of clamping effected by the race-pressing member, since the curvature center of each race-receiving groove and that of the loaded ball groove formed in the bearing race provided in the race-receiving groove are made coincident with each other, there is no possibility of any undesirable displacement of the curvature center of the loaded ball groove. Accordingly, even when there is any mounting error produced, the contact pressure of the balls will never be nonuniform, advantageously.

Although the invention has been described by means of specific terms, it is to be noted here that the described embodiment is not exclusive and various changes and modifications may be imparted thereto without departing from the scope of the invention which is limited solely by the appended claims.

What is claimed is:

1. A linear slide bearing comprising:
   a main body being an integral member constituted by right and left skirt portions defining a central cavity therebetween, each skirt portion being provided in its inner surface with a race-receiving groove opened to said central cavity, said race-receiving groove having a stopper projecting at its lower arcuate end, and each skirt portion further having a non-loaded ball passage bored therethrough;
   a pair of right and left bearing races each constituted by an arcuate member of semicircular cross-section having a barrel-like outer peripheral surface and rockably mounted within the corresponding race-receiving groove formed in said main body, said arcuate member being provided in its inner surface center with a loaded ball groove having a curvature center which is coincident with that of said race-receiving groove;
   a race-pressing member constituted by a wedge member adjustably screwed to the inner surface of a ceiling portion of said main body, said race-pressing member being adapted to press said bearing races toward said stoppers with its wedge surfaces which are simultaneously made to abut on one of the inner side surfaces of said bearing races;

a track shaft adapted to be fitted in said central cavity of said main body and provided on its right and left side surfaces with loaded ball grooves each having a curvature center which is coincident with that of the corresponding loaded ball groove on each bearing race;

a pair of front and rear end covers constituted by cover members adapted to be secured to the longitudinal end surfaces of said main body, each cover member being provided in its inner surfaces with ball turning grooves providing communication between loaded ball passages, which are defined by said loaded ball grooves on said bearing races and track shaft, and said non-loaded ball passages formed through said main body, as well as race retaining grooves for supporting one of the ends of said bearing races; and balls adapted to be recirculated through said loaded ball passages and non-loaded ball passages respectively communicated with each other.

2. A linear slide bearing according to claim 1, wherein said main body is formed of a light-weight synthetic resin.

3. A linear slide bearing according to claim 1, wherein the angle of contact between each ball and the corresponding loaded ball groove is selected to be about 45°.

4. A linear slide bearing according to claim 1, wherein each of said loaded ball grooves, defining each loaded ball passage, is constituted by a groove having an arcuate cross-section.

* * * * *